H. H. KEMPF.
STORAGE BATTERY.
APPLICATION FILED MAY 13, 1910.

1,010,377.

Patented Nov. 28, 1911.

Witnesses:
Samuel W. Balsh
Frank C. Cole

Inventor.
Herman Henry Kempf
by Thomas Ewing Jr
Attorney.

UNITED STATES PATENT OFFICE.

HERMAN HENRY KEMPF, OF NEW YORK, N. Y., ASSIGNOR TO SAMUEL JOHNSTON, OF NEW YORK, N. Y.

STORAGE BATTERY.

1,010,377.  Specification of Letters Patent.  Patented Nov. 28, 1911.

Application filed May 13, 1910. Serial No. 561,246.

*To all whom it may concern:*

Be it known that I, HERMAN HENRY KEMPF, a citizen of the United States of America, and a resident of the borough of Brooklyn, in the city of New York, county of Kings, and State of New York, have invented certain new and useful Improvements in Storage Batteries, of which the following is a specification.

This invention relates to the combination with a storage battery of an electric meter by which the strength of the battery may be ascertained without being to the necessity of attaching a meter separate therefrom, only the depression of a key being required to throw the current into the meter and show the reading.

The object of the invention is to so arrange the means of attachment and connections that the meter may be secured to the inclosing casing of the battery after the battery has been made complete in other respects including the pouring in of the sealing compound, whereby the compound may be allowed to cool off before attaching the meter so that the meter will not be injured by the heat.

Further objects relate to the arrangement of electrical connections so that they are properly completed upon securing the meter to the casing.

Further objects relate to the provision of a shunt and connections whereby this is connected into the battery circuit so as to put the battery under load when a reading is to be taken as the reading will then become indicative of the degree of charge remaining in the battery.

Figure 1:
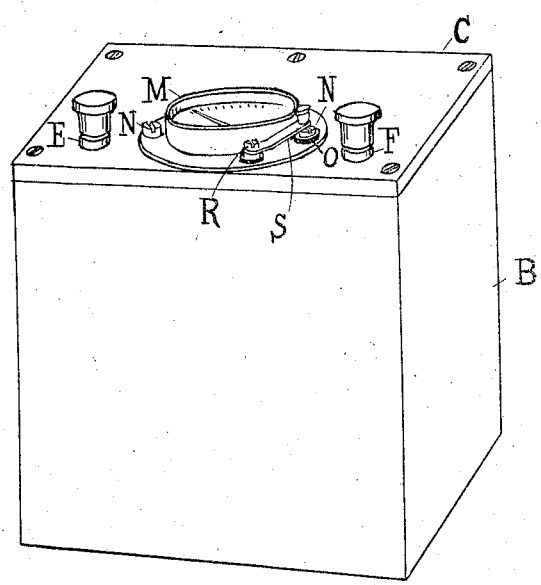
Figure 2:
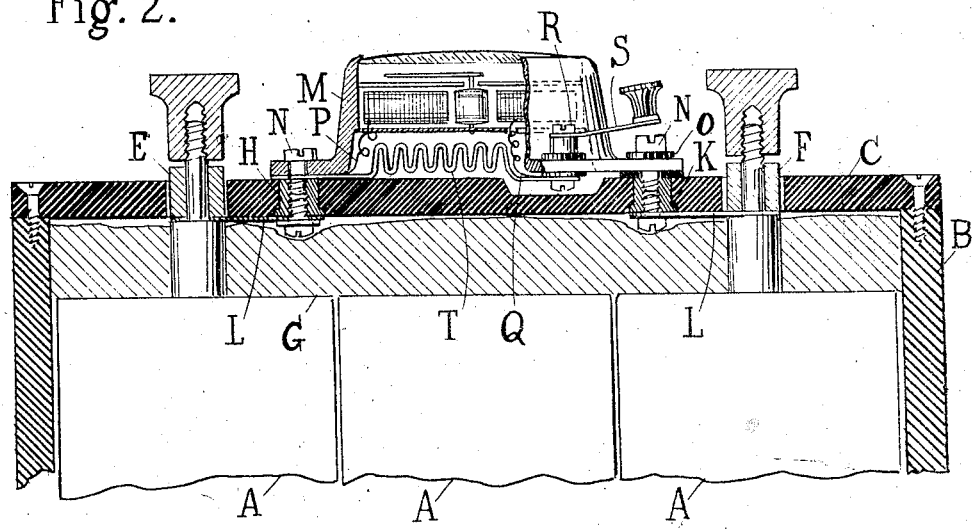

In the accompanying sheet of drawings which forms a part of this application—Figure 1 is a perspective of a storage battery embodying my invention. Fig. 2 is a vertical section showing the upper part of the battery, the means of attachment for the electric meter, the shunt and connections.

Three battery cells A A A are shown inclosed in a casing B. The top of the casing is an insulating plate C through which the positive and negative terminals E and F of the cells project. Sealing compound G, as wax, is melted and poured onto the cells, filling the space between the tops of the cells and the underside of the cover plate. Threaded sockets H and K are secured to the cover plate and one is electrically connected to one of the cell terminals and the other to the other cell terminal by wires L L which lead under the cover plate.

A volt meter M in a suitable metal frame is secured to the sockets in the cover plate by screws N N, at one screw and socket insulation O being interposed. It is not essential, however, that the meter frame be entirely of metal, and if it is of hard rubber this special insulation is unnecessary. In this case the electrical connections will lead to the points of attachment in the case of both leads. The electrical connections or terminals of the meter are one P to the meter frame or point where it is secured to one of the sockets without insulation, and the other Q to an insulated stud R supported by the meter frame. A normally open spring switch S is attached to the insulated stud and serves when depressed to electrically connect the stud with the securing screw which is insulated through the meter frame, thereby establishing connections from the battery terminals through the meter. A pocket is formed under the meter frame and contains therein a resistance T which may be proportioned to carry about ten amperes at the battery voltage, the amount carried, however, depending upon the size of the battery. The terminals of this resistance are connected to the same points as the terminals of the meter so that upon closure of the switch this resistance will also be connected to the battery terminals and the battery put under load, so that the voltage will fall to a point indicative of the charge.

What I claim as new, and desire to secure by Letters Patent of the United States, is—

1. The combination in a storage battery having positive and negative terminals, of an inclosing casing with an insulating plate, a pair of threaded sockets secured to the plate, one being connected with the positive and the other to the negative terminal, an electric meter the frame of which is adapted to be secured to the sockets by suitable securing means with interposed insulation between the frame and one of the sockets with its securing means, electrical connections from the meter to the securing means, and a normally open spring switch interposed in the connections, substantially as described.

2. The combination in a storage battery having positive and negative terminals, of an inclosing casing with an insulating plate, a pair of threaded sockets secured to the plate, one being connected to the positive and the other to the negative terminal, an electric meter the frame of which is adapted to be secured to the sockets by suitable securing means with insulation between the frame and one of the sockets with its securing means, a resistance connected in parallel with the meter, electrical connections between one terminal of the meter and one terminal of the resistance, and one terminal of the battery, a spring switch connected to the other terminal of the battery, and connections between the other terminal of the meter and the other terminal of the resistance with the spring switch, substantially as described.

Signed by me in the borough of Brooklyn, city of New York, county of Kings and State of New York, this third day of May, 1910.

HERMAN HENRY KEMPF.

Witnesses:
  MAY BYRNE,
  HERBERT E. SCHANZENBACH.